United States Patent
Chhabra et al.

(10) Patent No.: US 8,598,984 B2
(45) Date of Patent: Dec. 3, 2013

(54) SYSTEMS AND METHODS FOR PROVIDING LOCATION-AWARE WI-FI ACCESS FOR A PORTABLE DEVICE

(75) Inventors: Kapil Chhabra, Sunnyvale, CA (US); Sandesh Goel, Pune (IN)

(73) Assignee: Marvell World Trade Ltd., St. Michael (BB)

( * ) Notice: Subject to any disclaimer, the term of this patent is extended or adjusted under 35 U.S.C. 154(b) by 1124 days.

(21) Appl. No.: 12/437,312

(22) Filed: May 7, 2009

(65) Prior Publication Data

US 2009/0278705 A1 Nov. 12, 2009

Related U.S. Application Data

(60) Provisional application No. 61/051,725, filed on May 9, 2008.

(51) Int. Cl.
*G01S 5/02* (2010.01)

(52) U.S. Cl.
USPC .......................................... 340/8.1; 455/456.3

(58) Field of Classification Search
USPC ................ 340/539.1, 539.2, 539.23, 539.32, 340/572.1, 572.5, 572.7, 1.1, 8.1, 10.1, 340/10.2, 10.3, 10.34, 10.4, 10.41; 455/45.1, 456.2, 411, 434, 440, 441, 455/442, 67.11, 552.1
See application file for complete search history.

(56) References Cited

U.S. PATENT DOCUMENTS

| | | | |
|---|---|---|---|
| 2004/0203890 A1* | 10/2004 | Karaoguz et al. | 455/456.1 |
| 2005/0030708 A1 | 2/2005 | Kawasaki et al. | |
| 2005/0058112 A1 | 3/2005 | Lahey et al. | |
| 2005/0143094 A1* | 6/2005 | Reed et al. | 455/456.2 |
| 2006/0063560 A1* | 3/2006 | Herle | 455/552.1 |
| 2007/0167174 A1 | 7/2007 | Halcrow et al. | |
| 2008/0305786 A1* | 12/2008 | Arumi et al. | 455/426.1 |
| 2009/0098857 A1* | 4/2009 | De Atley | 455/411 |
| 2009/0124284 A1* | 5/2009 | Scherzer et al. | 455/552.1 |
| 2009/0298496 A1* | 12/2009 | Pettersson et al. | 455/434 |

FOREIGN PATENT DOCUMENTS

| | | |
|---|---|---|
| JP | 2004286460 A | 10/2004 |
| JP | 2004320473 A | 11/2004 |
| JP | 2005057359 A | 3/2005 |
| JP | 2006324915 A | 11/2006 |
| WO | WO-2007014177 A1 | 2/2007 |
| WO | WO-2007082913 A1 | 7/2007 |

OTHER PUBLICATIONS

Office Action for CN200980115562.8 mailed Jan. 23, 2013.

(Continued)

*Primary Examiner* — Nabil Syed

(57) ABSTRACT

Methods and systems for providing location-aware WiFi access for a portable device include determining an initial location of the portable device and transmitting the initial location to a WiFi location provider, wherein the WiFi location provider comprises locations and WiFi parameters for a plurality of WiFi access points, wherein each WiFi access point has a corresponding wireless range. The locations and the WiFi parameters for a set of WiFi access points are then received from the WiFi location provider, wherein the set of WiFi access points are within a radius of the initial location of the portable device. At least one WiFi access point in the set of WiFi access points is scanned for that contains the portable device within its wireless range. The portable device then connects to the at least one WiFi access point, thereby forming a WiFi connection.

30 Claims, 3 Drawing Sheets

(56) References Cited

OTHER PUBLICATIONS

Notice of Reasons for Rejection for JP 2011-508685 mailed Mar. 12, 2013.

Notice of Reasons for Rejection for JP 2011-508685 dated Oct. 1, 2013.

Office Action for CN200980115562.8 dated Oct. 8, 2013.

* cited by examiner

SYSTEMS AND METHODS FOR PROVIDING LOCATION-AWARE WI-FI ACCESS FOR A PORTABLE DEVICE

CROSS-REFERENCE TO RELATED APPLICATIONS

This application claims the benefit of U.S. Provisional Patent Application No. 61/051,725, filed May 9, 2008, assigned to the assignee of the present application, and incorporated herein by reference.

BACKGROUND OF THE INVENTION

Certain mobile phone devices, which can be known also as "smart phones," can have wireless fidelity ("WiFi™") and global positioning system ("GPS") transceivers, in addition to long range communications technology, which is typically based upon the Global System for Mobile communications ("GSM") or code division multiple access ("CDMA") mobile phone standards. While GSM/CDMA are typically used to handle voice services, other technologies, such as Enhanced Data rates for GSM Evolution ("EDGE"), General Packet Radio Service ("GPRS"), and High Speed Downlink Packet Access ("HSDPA") are typically utilized for data services. However, it is generally preferable to use WiFi, a short-range technology, for voice and data services when possible because WiFi is typically available at lower cost than the above-mentioned technologies, and can provide higher throughput.

Since WiFi is a short range technology with potentially limited availability, users of conventional mobile phones can have difficulty utilizing the benefits that WiFi can provide. One way users can utilize WiFi technology is by manually searching for WiFi access, using trial and error at different locations in hopes of locating a WiFi access point. This can be disadvantageous because it requires user intervention, can be time consuming, and is generally inefficient unless the user knows of the location of WiFi access point. Another approach users of mobile phones can utilize is to maintain their WiFi transceivers in a continuous scan mode, where the device searches for available access points. While utilizing a continuous scan mode generally does not require much user intervention, the continuous scan mode can be highly power-intensive, and can reduce the battery life of the mobile phone.

BRIEF SUMMARY OF THE INVENTION

Methods and systems for providing location-aware WiFi access for a portable device include determining an initial location of the portable device and transmitting the initial location to a WiFi location provider, wherein the WiFi location provider comprises locations and WiFi parameters for a plurality of WiFi access points, wherein each WiFi access point has a corresponding wireless range. The locations and the WiFi parameters for a set of WiFi access points are then received from the WiFi location provider, wherein the set of WiFi access points are within a radius of the initial location of the portable device. At least one WiFi access point in the set of WiFi access points is scanned for that contains the portable device within its wireless range. The portable device then connects to the at least one WiFi access point, thereby forming a WiFi connection.

In a further embodiment, in response to receiving the locations and the WiFi parameters for the set of WiFi access points and prior to scanning, the portable device may selectively powering ON a WiFi transceiver when the location of the portable device falls within the wireless range of the at least one WiFi access point and when the portable device is moving at a velocity less than a predetermined velocity. If these conditions are not met, then the WiFi transceiver remains powered OFF, which may result in power savings for the portable device.

DETAILED DESCRIPTION OF THE INVENTION

The present invention relates to providing location-aware WiFi access for a portable device. The following description is presented to enable one of ordinary skill in the art to make and use the invention and is provided in the context of a patent application and its requirements. Various modifications to the embodiments and the generic principles and features described herein can be made. Thus, the present invention is not intended to be limited to the embodiments shown, but is to be accorded the widest scope consistent with the principles and features described herein.

Figure 1:
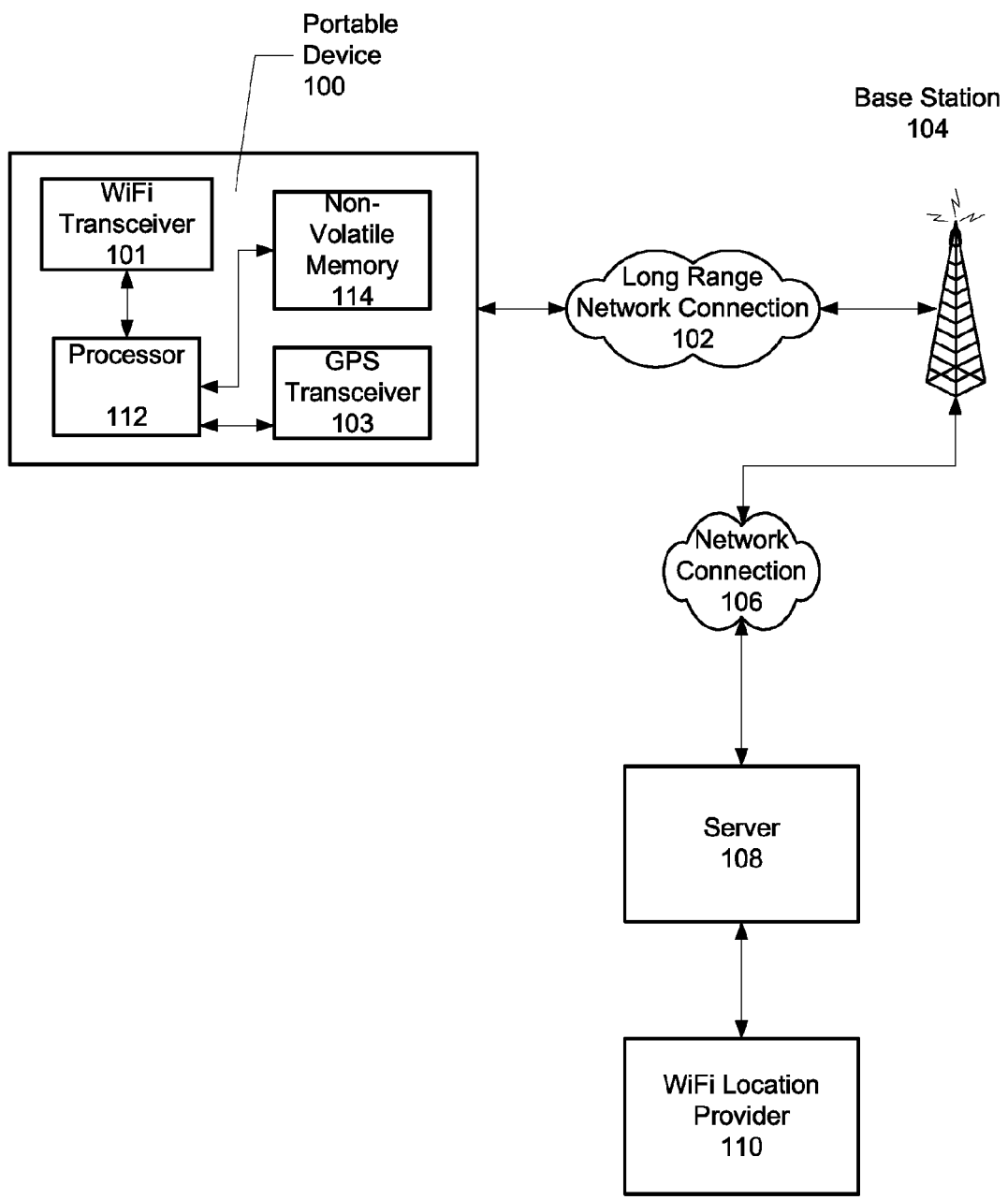
FIG. 1 illustrates an exemplary embodiment of a system for providing location-aware WiFi access for a portable device.

FIG. 1 illustrates an exemplary embodiment of a system for providing location-aware WiFi access for a portable device. The system can include a mobile device 100, a long-range network connection 102, a base station 104, a network connection 106, a server 108, and a Wifi location provider 110. The mobile device 100 may be any electronic device operative to provide voice and data services over a WiFi connection and that is able to obtain its own location (i.e., using GPS technology, cell tower triangulation, or another location-providing technology). The mobile device 100 may be generally any portable, mobile, or hand-held wireless electronic device that is operative as described above (e.g., a mobile telephone, a hand-held computer, and the like). The mobile device 100 can include WiFi transceiver 101, which can be used to communicate over a WiFi connection, and GPS transceiver 103, which can provide the location of the portable device 100. The WiFi transceiver 101 and the GPS transceiver 103 can be each coupled to a processor 112, which can be configured as described below. The mobile device 100 can also include a non-volatile memory 114, which can be used to store data on the mobile device 100 as described below.

The mobile device 100 can interact with the base station 104 through the long-range network connection 102. Long-range network connection 102 can be a network connection with range greater than a WiFi connection, and can be based upon a long range communications technology as described above (e.g., GSM, CDMA, EDGE, HSDPA and/or GPRS). Base station 104 can function as a transceiver, and can receive transmissions from the mobile device 100 and send transmissions to the mobile device 100 using long-range network connection 102. The base station 104 can be a base transceiver station in an exemplary embodiment used in mobile telephone communications.

The base station 104 can interact with the server 108 using the network connection 106. The network connection 106 can be implemented through the Internet, or any other type of public or private wired or wireless network. The server 108 can be in communication with WiFi location provider 110. In one embodiment, the WiFi location provider may be an application executed or accessed by server 108. In another embodiment, the WiFi location provider may be a web service. WiFi location provider 110 can include a database (not shown) that contains the locations and WiFi parameters for a plurality of WiFi access points, and, in an exemplary embodiment, is accessible using mobile phone standards (e.g., GSM or CDMA). The WiFi location provider 110 can, in an exemplary embodiment, be located on a separate server from the server 108 (e.g., on a server storing a web page that contains the database, or on a separate server on the same network as the server 108). Alternatively, the WiFi location provider 110 can be on the server 108.

The system described in FIG. 1 can provide location-aware WiFi access for the portable device 100. The location of the portable device 100 can be used to determine areas proximate to the portable device 100 where WiFi access is available. Location-aware WiFi access can be provided without manual intervention, and the WiFi transceiver 101 can be powered ON only when WiFi access is available, which can thereby avoid continuous scanning that can be wasteful in terms of power consumption.

Figure 2:
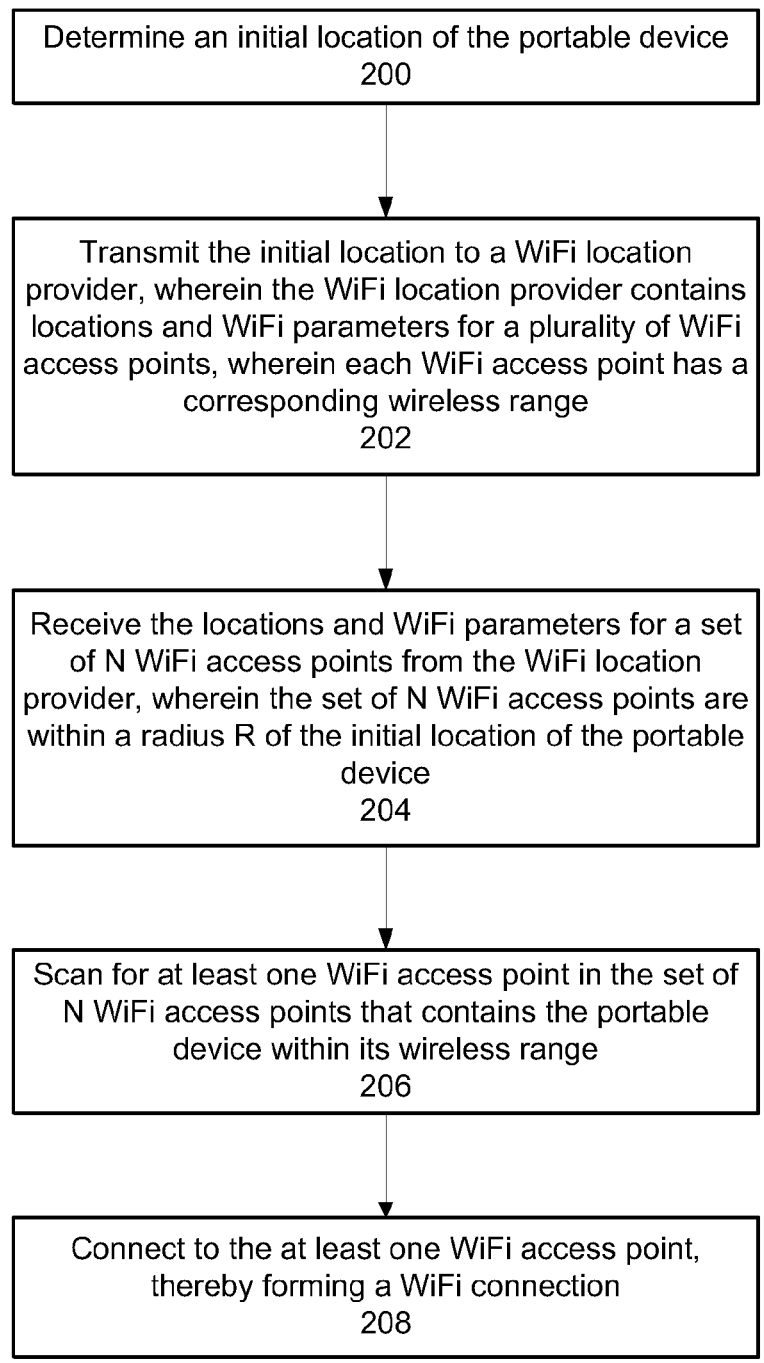
FIG. 2 illustrates an exemplary embodiment of a process for providing location-aware WiFi access for a portable device.

FIG. 2 illustrates an exemplary embodiment of a process for providing location-aware WiFi access for a portable device. The process may begin by determining an initial location of the portable device 100 (block 200). The initial location of the portable device 100 can be determined, for example, by using the GPS transceiver 103, or alternatively by using cell tower triangulation. The initial location of the portable device 100 may be represented by the coordinates $(x_{pd}, y_{pd}, z_{pd})$.

In an exemplary embodiment, the portable device 100 may receive an input requesting WiFi use. In one embodiment, the input requesting WiFi use can be input manually by a user using a graphic user interface for the portable device 100. This might be done, for example, when the user is aware that the portable device is located proximate to a WiFi access point, and would like to take advantage of the superior voice and/or data service that WiFi technology can provide. In another embodiment, the input requesting WiFi use can be automatically provided when the user requests to use voice and/or data services.

The initial location is transmitted to a WiFi location provider (e.g., WiFi location provider 110), wherein the WiFi location provider contains locations and WiFi parameters for a plurality of WiFi access points, wherein each WiFi access point has a corresponding wireless range (block 202). For example, the long-range network connection 102 can be used to transmit the portable device initial location $(x_{pd}, y_{pd}, z_{pd})$ to the base station 104. In an exemplary embodiment, the initial location can be sent to the base station 104 using a simple message service ("SMS") text message that is automatically generated (does not require the user to enter the coordinates). The portable device initial location $(x_{pd}, y_{pd}, z_{pd})$ can then be transferred to the server 108, which can access the WiFi location provider 110. Also, according to a further embodiment, the initial location can be transmitted to the WiFi location provider in response to the input requesting WiFi use.

The location for each WiFi access point within the WiFi location provider database can be expressed as coordinates in the form $(x_{ap-i}, y_{ap-i}, z_{ap-i})$, where "i" can refer to a unique string that identifies each WiFi access point. The wireless range can be a circle centered at the location for the WiFi access point $(x_{ap-i}, y_{ap-i}, z_{ap-i})$ with a radius $r_i$, which can be stored in the WiFi location provider in an exemplary embodiment. In another embodiment, the radius $r_i$ of all of the WiFi access points can be estimated to be a typical range (e.g., 50 meters, 100 meters, 500 meters, or any suitable range where effective data transmission can take place), instead of being stored in the WiFi location provider database.

WiFi parameters can include information needed for a portable device to establish a WiFi connection with a WiFi access point. For example, WiFi parameters contained within the WiFi location provider database can include at least one of the SSID, the channel number, the band, the security key, the country information element, and the quality of service parameters.

The locations and WiFi parameters are received for a set of N WiFi access points from the WiFi location provider, wherein the set of N WiFi access points are within a radius R of the initial location of the portable device (block 204). In an exemplary embodiment, this can be done by having the server 108 query the WiFi location provider for N WiFi access points most proximate to the portable device's initial location. N can be configurable to any predetermined number desired.

In an exemplary embodiment, the server 108 can, upon receiving the set of N WiFi access points, compute the radius R, which may correspond, for example, to the distance between the portable device 100 and the center of the farthest of the N WiFi access points. In an exemplary embodiment, R can be computed using the following formula:

$$R = \max(\text{square root}(x_{ap-i} - x_{pd})^2 + (y_{ap-i} - y_{pd})^2 + (z_{ap-i} - z_{pd})^2) \text{ for } 1 \leq i \leq N$$

Where $(x_{ap-i}, y_{ap-i}, z_{ap-i})$ are the coordinates of the $i^{th}$ WiFi access point and $(x_{pd}, y_{pd}, z_{pd})$ are the coordinates for the location of the portable device 100.

Figure 3:
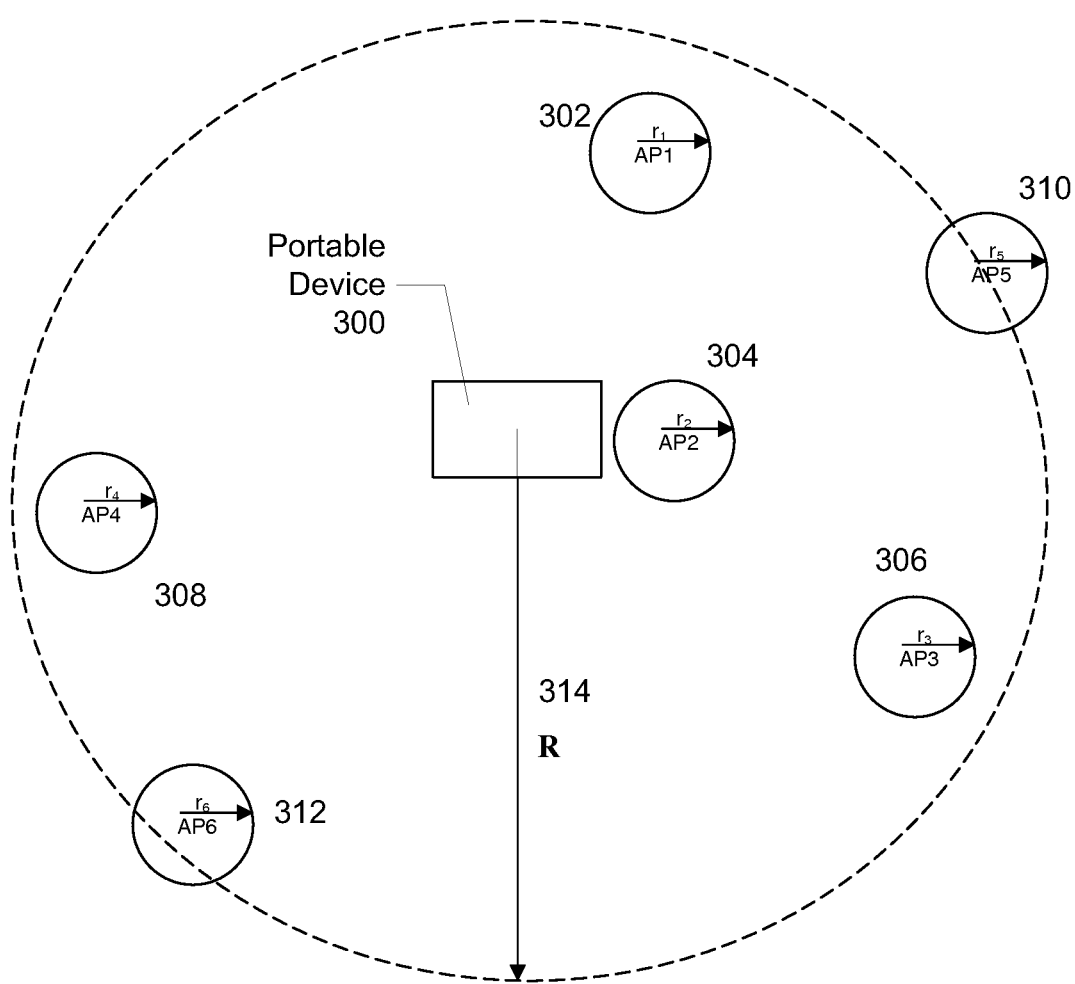
FIG. 3 illustrates an exemplary embodiment of a system for providing location-aware WiFi access for a portable device.

FIG. 3 illustrates an exemplary embodiment of a system for providing location-aware WiFi access for a portable device. FIG. 3 illustrates the set of N WiFi access points that are received by the portable device, for example.

In the system shown in FIG. 3, the server 108 returns to the portable device 300 the locations (in the form of coordinates) and WiFi parameters for a set of N=6 WiFi access points that are proximate to the portable device 300. Access points AP1 302, AP2 304, AP3 306, AP4 308, AP5 310, and AP6 312 have corresponding wireless ranges $r_1, r_2, r_3, r_4, r_5, r_6$ respectively, which can also be returned by the server 108. Radius R 314, also returned by the server 108 in the exemplary embodiment, is equal to the distance between the portable device 300 and the farthest access point AP5 310 within the set of returned access points. The locations, WiFi parameters, and wireless ranges of access points AP1 302, AP2 304, AP3 306, AP4 308, AP5 310, and AP6 312 and the radius R 314 can be sent to the portable device 300 using the long-range network connection 102, and in the exemplary embodiment can be sent using an SMS text message.

Referring again to FIG. 2, a scan is performed for at least one of the WiFi access points APT1 in the set of N WiFi access points that contains the portable device within its wireless range (block 206).

According to a further embodiment, in response receiving the locations and the WiFi parameters for the set of WiFi access points and prior to scanning, the portable device can selectively power ON the WiFi transceiver 101 when a current location of the portable device 100 falls within the wireless range of at least one of WiFi access point and when the portable device 100 is moving at a velocity less than a predetermined velocity V. To determine if the portable device 100 is moving less than the predetermined velocity V, the portable device 100 can utilize the GPS transceiver 103 in the exemplary embodiment. The threshold velocity V is configurable, and can be set, in an exemplary embodiment, to be an approximate of a user's walking speed of 2 meters/second. However, the threshold velocity V could also be set to be 2-4 meters/second, for example. For example, if the portable device 300 moved with a velocity less than V=2 meters/second and the portable device 300's location changed to be within the wireless range of access point APT2, then the WiFi transceiver of the portable device 300 would be powered ON. If the aforementioned conditions are not met, then the WiFi transceiver 101 would remain powered OFF, which can result in power savings.

In the case where the portable device 100 is within the wireless range of a single WiFi access point, the portable device can set the WiFi transceiver 101 to scan for the WiFi access point on the channel received from the WiFi location provider 110. In the case where the portable device 100 is within the wireless range of multiple WiFi access points, then logic can be utilized, in an exemplary embodiment, to prioritize the WiFi access points (e.g., scan for the access point most proximate to the portable device 100, scan for the access point with the highest data transfer rate, etc.). Once a WiFi access point has been selected, then the scan can be performed using the channel received from the WiFi location provider 110.

In an exemplary embodiment, the scanning for at least one of the N WiFi access points may be performed for a predetermined time T, after which the WiFi transceiver is turned OFF if a response is not received from at least one of the WiFi access points that contains the portable device within its wireless range. Failure to receive a response can be interpreted to mean that the WiFi access point or points that are being scanned for are non-existent and/or malfunctioning. In an exemplary embodiment, the failure to establish a WiFi connection can be communicated to the WiFi location provider 110, using an automatically generated and sent SMS text message, for example. Sending an SMS text message regarding the failure to establish a WiFi connection can be advantageous because sending the SMS text message can allow the WiFi location provider database to be updated, so future attempts to access a non-functioning WiFi access point can be avoided.

A connection is made to the at least one WiFi access point APT1, thereby forming a WiFi connection (block 208). In an exemplary embodiment, if the portable device 100 is within the wireless range of multiple WiFi access points, then logic can be used, as described above, to select a WiFi access point with which to form a connection. The WiFi connection can be used to take advantage of the potentially lower cost and higher throughput that WiFi technology can provide for voice and data services.

In an exemplary embodiment, the portable device 100 also contains a non-volatile memory 114, and a profile can be stored for the WiFi connection on the non-volatile memory, wherein the profile includes the location of the portable device at an initial time when the WiFi connection was formed and the WiFi parameters of the WiFi access point with which the WiFi connection was formed. The WiFi transceiver can be powered ON at a later time when the portable device is within a distance 2*d of the current location of the portable device at an initial time when the WiFi connection was formed, and automatically attempt to reconnect with the WiFi access point by using the WiFi parameters stored within the profile for the WiFi connection. The distance d is configurable, and can, for example, be the typical range of a WiFi access point, 100 meters. However, d can also be set to be any distance from 50 meters to 200 meters, for example.

By storing the profile for the WiFi connection on the portable device 100, the portable device 100 is able to reconnect with the WiFi access point at a later time without being required to receive the location and WiFi parameters for the WiFi access point from the WiFi location provider 110. This can be advantageous in terms of saving time and power consumption. Profiles can be stored on the portable device 100 not only for WiFi access points found using the WiFi location provider 110, but also for any other WiFi access point utilized by the portable device 100, including Wi-Fi access points where connections are established manually by a user or by using WiFi protected setup.

In an exemplary embodiment, a user of the portable device can be provided directions to change the current location of the portable device to a suggested location in order to improve the quality of the WiFi connection. The suggested location can be, for example, closer to the coordinates of the WiFi access point provided by the WiFi location provider 110. The user can be prompted for an input confirming that the user is in the suggested location before attempting to reconnect with the WiFi access point. This can be advantageous, as illustrated in FIG. 3. The user of portable device 300 could be instructed, using a graphical user interface, to move closer to the nearest WiFi access point AP2 304. The user could, upon moving into the wireless range of WiFi access point AP2 304, depress a button on the portable device 300, causing the portable device to attempt to reconnect with the WiFi access point AP2 304.

In an exemplary embodiment, the portable device 300 can refresh its WiFi access point records if the portable device 300 moves to a second location that is farther than the radius R from the initial location of the portable device 300. The portable device can then be provided with a new set of WiFi access points within a radius R2 from its second location.

The second location can be transmitted to the WiFi location provider 110, where the second location is a distance greater than the radius R from the initial location of the portable device, as described above. A set of N2 WiFi access points can be received from the WiFi location provider 110, where the set of N2 WiFi access points are within a radius R2 of the second location of the portable device.

The WiFi transceiver can then be powered ON when the portable device is moving at a velocity less than a predetermined velocity V and when the location of the portable device falls within the wireless range of at least one of the WiFi access points APT2 within the set of N2 WiFi access points. At least one of the WiFi access points APT2 that contains the portable device within its wireless range can be scanned for after selectively powering ON the WiFi transceiver. A connection can be made with one of the WiFi access points APT2 that contains the portable device within its wireless range, thereby forming a second WiFi connection, as described above.

A method and system for location-aware WiFi access for a portable device has been disclosed. The present invention is mainly described in terms of particular systems provided in particular implementations. However, this method and system may operate effectively in other implementations. For example, the systems, devices, and networks usable with the present invention can take a number of different forms. The present invention will also be described in the context of particular methods having certain steps. However, the method and system operate effectively for other methods having different and/or additional steps or steps in a different order not inconsistent with the present invention.

The present invention has been described in accordance with the embodiments shown, and there could be variations to the embodiments, and any variations would be within the scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made without departing from the scope of the appended claims.

We claim:

1. A method for providing location-aware WiFi access for a portable device, the method comprising:
   determining an initial location of the portable device;
   transmitting the initial location of the portable device to a WiFi location provider, wherein the WiFi location provider comprises locations, WiFi parameters, and wireless ranges for a plurality of WiFi access points;
   receiving, from the WiFi location provider, a respective location, a respective set of WiFi parameters, and a respective wireless range for each WiFi access point included in a set of WiFi access points, wherein the each WiFi access point included in the set of WiFi access points is within a radius of the initial location of the portable device;
   determining a subset of WiFi access points of the set of WiFi access points, each WiFi access point in the subset of WiFi access points containing the portable device within the respective wireless range of the each WiFi access point;
   scanning for at least one WiFi access point in the subset of WiFi access points; and
   connecting to one of the at least one WiFi access point in the subset of WiFi access points, thereby forming a WiFi connection.

2. The method of claim 1, further comprising, in response to receiving the respective location, the respective set of WiFi parameters, and the respective wireless range for the each WiFi access point included in the set of WiFi access points, selectively powering ON a WiFi transceiver of the portable device when a current location of the portable device falls within the respective wireless range of one or more WiFi access points in the subset and when the portable device is moving at a velocity less than a predetermined velocity.

3. The method of claim 2, further comprising:
   powering ON the WiFi transceiver at a later time when the portable device is within a distance 2*d of the current location of the portable device at an initial time when the WiFi connection was formed; and
   automatically attempting to reconnect with the one of the at least one WiFi access point by using the respective set of WiFi parameters stored within a profile for the WiFi connection.

4. The method of claim 3, wherein d is configurable.

5. The method of claim 2, further comprising:
   providing directions to a user of the portable device to change the current location of the portable device to a suggested location in order to improve quality of the WiFi connection; and
   prompting the user for an input confirming that the user is in the suggested location before attempting to reconnect with the one of the at least one WiFi access point.

6. The method of claim 2, wherein the scanning for the at least one WiFi access point in the subset of WiFi access points is performed for a predetermined time, after which the WiFi transceiver is turned OFF if a response is not received from the at least one WiFi access point in the subset of WiFi access.

7. The method of claim 1, wherein the transmitting the initial location to the WiFi location provider is performed using a SMS message, wherein the SMS message comprises coordinates of the portable device.

8. The method of claim 1, wherein the respective set of WiFi parameters comprises at least one of a SSID, a channel number, a band, a security key, a country information element, and quality of service parameters.

9. The method of claim 1, wherein the radius comprises a distance between the portable device and a farthest access point in the set of the WiFi access points.

10. The method of claim 1, wherein the portable device comprises a non-volatile memory, and wherein the method further comprises storing a profile for the WiFi connection in the non-volatile memory, wherein the profile comprises the initial location of the portable device at an initial time when the WiFi connection was formed and the respective set of WiFi parameters of the one of the at least one WiFi access point with which the WiFi connection was formed.

11. A portable device that provides location-aware WiFi access, the portable device comprising:
    a WiFi transceiver; and
    a processor, wherein the processor is configured to:
       determine an initial location of the portable device;
       transmit the initial location of the portable device to a WiFi location provider, wherein the WiFi location provider comprises locations and WiFi parameters for a plurality of WiFi access points, wherein each WiFi access point has a respective wireless range;
       receive a respective location, a respective set of WiFi parameters, and the respective range for each WiFi access point included in a set of WiFi access points from the WiFi location provider, wherein the each WiFi access point included in the set of WiFi access points is within a radius of the initial location of the portable device;
       determine a subset of WiFi access points of the set of WiFi access points, each WiFi access point in the subset of WiFi access points containing the portable device within the respective wireless range of the each WiFi access point;
       scan for at least one WiFi access point in the subset of WiFi access points; and
       connect to one of the at least one WiFi access point in the subset of WiFi access points, thereby forming a WiFi connection.

12. The portable device of claim 11, wherein the processor is further configured to, in response to receiving the respective location, the respective set of WiFi parameters, and the respective wireless range for the each WiFi access point included in the set of WiFi access points, selectively power ON a WiFi transceiver of the portable device when a current location of the portable device falls within the respective wireless range of one or more WiFi access points in the subset and when the portable device is moving at a velocity less than a predetermined velocity.

13. The portable device of claim 12, wherein the WiFi transceiver is powered ON at a later time when the portable device is within a distance 2*d of the current location of the portable device at an initial time when the WiFi connection was formed, and wherein the processor is further configured to automatically attempt to reconnect with the one of the at least one WiFi access point by using the respective set of WiFi parameters stored within a profile for the WiFi connection.

14. The portable device of claim 13, wherein d is configurable.

15. The portable device of claim 12, wherein a user of the portable device is provided with directions to change the current location of the portable device to a suggested location in order to improve quality of the WiFi connection, and wherein the processor is further configured to prompt the user for an input confirming that the user is in the suggested location before attempting to reconnect with the one of the at least one WiFi access point.

16. The portable device of claim 12, wherein the scan for the at least one WiFi access point in the subset of WiFi access points is performed for a predetermined time, after which the WiFi transceiver is turned OFF if a response is not received.

17. The portable device of claim 11, wherein the processor is configured to transmit the initial location to the WiFi location provider by using a SMS message, wherein the SMS message comprises coordinates of the portable device.

18. The portable device of claim 11, wherein the respective set of WiFi parameters comprises at least one of a SSID, a channel number, a band, a security key, a country information element, and quality of service parameters.

19. The portable device of claim 11, wherein the radius comprises a distance between the portable device and a farthest access point in the set of the WiFi access points.

20. The portable device of claim 11, wherein the portable device comprises a non-volatile memory, and wherein the processor is further configured to store a profile for the WiFi connection in the non-volatile memory, wherein the profile comprises the initial location of the portable device at an initial time when the WiFi connection was formed and the respective set of WiFi parameters of the one of the at least one WiFi access point with which the WiFi connection was formed.

21. A memory for use in a portable device, the memory storing program instructions for providing location-aware WiFi access for the portable device, and the program instructions being executable by a processor to:
  determine an initial location of the portable device;
  transmit the initial location to a WiFi location provider, wherein the WiFi location provider comprises locations and WiFi parameters for a plurality of WiFi access points, wherein each WiFi access point has a respective wireless range;
  receive, from the WiFi location provider, a respective location, a respective set of WiFi parameters, and the respective range for each WiFi access point included in a set of WiFi access points, wherein the each WiFi access point included in the set of WiFi access points is within a radius of the initial location of the portable device;
  determine a subset of WiFi access points in the set of WiFi access points, each WiFi access point in the subset of WiFi access points containing the portable device within the respective wireless range of the each WiFi access point;
  scan for at least one WiFi access point in the subset of WiFi access; and
  connect to one of the at least one WiFi access point in the subset, thereby forming a WiFi connection.

22. The memory of claim 21, storing further program instructions executable by the processor to:
  in response to receiving the respective location, the respective set of WiFi parameters, and the respective wireless range for the each WiFi access point included in the set of WiFi access points, selectively power ON a WiFi transceiver of the portable device when a current location of the portable device falls within the respective wireless range of one or more access points in the subset and when the portable device is moving at a velocity less than a predetermined velocity.

23. The memory of claim 22, storing further program instructions executable by the processor to:
  power ON the WiFi transceiver at a later time when the portable device is within a distance 2*d of the current location of the portable device at an initial time when the WiFi connection was formed; and
  automatically attempt to reconnect with the one of the at least one WiFi access point by using the respective set of WiFi parameters stored within a profile for the WiFi connection.

24. The memory of claim 23, wherein d is configurable.

25. The memory of claim 22, storing further program instructions executable by the processor to:
  provide directions to a user of the portable device to change the current location of the portable device to a suggested location in order to improve quality of the WiFi connection; and
  prompt the user for an input confirming that the user is in the suggested location before attempting to reconnect with the one of the at least one WiFi access point.

26. The memory of claim 22, wherein the scan for the at least one WiFi access point is performed for a predetermined time, after which the WiFi transceiver is turned OFF if a response is not received.

27. The memory of claim 21, wherein the transmission of the initial location to the WiFi location provider is performed using a SMS message, and wherein the SMS message comprises coordinates of the portable device.

28. The memory of claim 21, wherein the respective set of WiFi parameters comprises at least one of a SSID, a channel number, a band, a security key, a country information element, and quality of service parameters.

29. The memory of claim 21, wherein the radius comprises a distance between the portable device and a center of a farthest of in the set of the WiFi access points.

30. The memory of claim 21, wherein the portable device comprises a non-volatile memory, and wherein the memory further stores program instructions executable by the processor to store a profile for the WiFi connection in the non-volatile memory of the portable device, wherein the profile comprises the initial location of the portable device at an initial time when the WiFi connection was formed and the respective set of WiFi parameters of the one of the at least one WiFi access point with which the WiFi connection was formed.

* * * * *